United States Patent
Wu et al.

(10) Patent No.: US 10,581,070 B2
(45) Date of Patent: Mar. 3, 2020

(54) COATED NICKEL-BASED CATHODE MATERIALS AND METHODS OF PREPARATION

(71) Applicant: APPLE INC., Cupertino, CA (US)

(72) Inventors: Huiming Wu, San Jose, CA (US); Hongli Dai, Los Altos, CA (US); Chi-Kai Lin, Sunnyvale, CA (US); Fiona C. Strobridge, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 169 days.

(21) Appl. No.: 15/551,353

(22) PCT Filed: Jul. 28, 2017

(86) PCT No.: PCT/US2017/044394
§ 371 (c)(1),
(2) Date: Aug. 16, 2017

(87) PCT Pub. No.: WO2018/026650
PCT Pub. Date: Feb. 8, 2018

(65) Prior Publication Data
US 2018/0233737 A1  Aug. 16, 2018

Related U.S. Application Data

(60) Provisional application No. 62/369,884, filed on Aug. 2, 2016.

(51) Int. Cl.
*H01M 4/36* (2006.01)
*H01M 4/485* (2010.01)
(Continued)

(52) U.S. Cl.
CPC ........... *H01M 4/366* (2013.01); *H01M 4/485* (2013.01); *H01M 4/505* (2013.01); *H01M 4/525* (2013.01);
(Continued)

(58) Field of Classification Search
CPC ........... H01M 4/525; H01M 2004/028; H01M 4/505; H01M 4/485; H01M 4/131; H01M 4/1391; H01M 4/02
See application file for complete search history.

(56) References Cited

U.S. PATENT DOCUMENTS 7,727,673 B2  6/2010 Ooyama et al.
8,911,903 B2  12/2014 Watanabe et al.
(Continued)

FOREIGN PATENT DOCUMENTS

CN  102201573 A  9/2011
EP  2963708 A1  1/2016
(Continued)

*Primary Examiner* — Imran Akram
(74) *Attorney, Agent, or Firm* — Young Basile Hanlon & MacFarlane, P.C.

(57) ABSTRACT

Cathode active materials have composite particles each with a base particle having the following formula: $Li_aNi_xM_yCo_zO_2$, wherein $0.95 \leq a \leq 1.5$, $0.6 \leq x \leq 1.0$, $0 \leq y \leq 0.5$, $0 \leq z \leq 0.5$; $x+y+z=1$; and M is one of Mn and Al, and coating particles coating each base particle, the coating particles having the following formula: $Li_aNi_bMn_cCo_dO_2$, wherein $0.95 \leq a \leq 1.5$, $0 \leq b \leq 0.35$, $0 \leq c \leq 1.0$, $0 \leq d \leq 1.0$ and $b+c+d=1$.

12 Claims, 14 Drawing Sheets

(51) Int. Cl.
*H01M 4/505* (2010.01)
*H01M 4/525* (2010.01)
*H01M 10/0525* (2010.01)
*H01M 4/58* (2010.01)
*H01M 4/02* (2006.01)

(52) U.S. Cl.
CPC ..... *H01M 4/5825* (2013.01); *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 9,118,075 B2 | 8/2015 | Chang et al. | |
| 2001/0010807 A1* | 8/2001 | Matsubara | H01M 4/525 423/277 |
| 2005/0069758 A1* | 3/2005 | Kitao | H01M 4/131 429/50 |
| 2005/0158546 A1* | 7/2005 | Shizuka | H01M 4/0404 428/402 |
| 2007/0048597 A1* | 3/2007 | Ryu | H01M 4/131 429/66 |
| 2008/0008933 A1 | 1/2008 | Lampe-Onnerud | |
| 2010/0117025 A1* | 5/2010 | Takeuchi | H01M 4/131 252/182.1 |
| 2012/0244413 A1* | 9/2012 | Shimano | C01G 1/02 429/144 |
| 2013/0045421 A1* | 2/2013 | Kobino | C01G 45/006 429/223 |
| 2014/0050976 A1* | 2/2014 | Nagai | H01M 4/131 429/211 |
| 2015/0155553 A1 | 6/2015 | Cho et al. | |
| 2016/0006031 A1* | 1/2016 | Kaseda | H01M 4/131 429/223 |
| 2016/0260965 A1* | 9/2016 | Wu | H01M 4/139 |

FOREIGN PATENT DOCUMENTS

| | | |
|---|---|---|
| WO | 2014103211 A1 | 7/2014 |
| WO | 2016017079 A1 | 2/2016 |

* cited by examiner

COATED NICKEL-BASED CATHODE MATERIALS AND METHODS OF PREPARATION

CROSS-REFERENCE TO RELATED APPLICATIONS

This application claims the benefit of U.S. Provisional Application No. 62/369,884, filed on Aug. 2, 2016, and entitled "Coated Nickel-Based Cathode Materials and Methods of Preparation," which is incorporated herein in its entirety by reference.

TECHNICAL FIELD

This application generally relates to rechargeable lithium batteries.

BACKGROUND

Rechargeable lithium batteries are widely used as an energy source for both small and large electronic devices. Lithium batteries may use cathode materials containing nickel. However, nickel-based cathode materials can contribute to low volumetric energy density, high-percent capacity irreversibility in the first cycle, capacity degradation as a function of cycle number, and low rate capabilities.

SUMMARY

The disclosed embodiments provide cathode active materials that comprise a base particle having the following formula: $Li_\alpha Ni_x M_y Co_z O_2$, wherein $0.95 \leq \alpha \leq 1.5$, $0.6 \leq x \leq 1.0$, $0 \leq y \leq 0.5$, $0 \leq z \leq 0.5$; $x+y+z=1$; and M is one of Mn and Al. The cathode active materials further comprise coating particles coated on the base particle, the coating particles having the following formula: $Li_a Ni_b Mn_c Co_d O_2$, wherein $0.95 \leq a \leq 1.5$, $0 \leq b \leq 0.35$, $0 \leq c \leq 1.0$, $0 \leq d \leq 1.0$ and $b+c+d=1$.

In some embodiments, the base particle has a particle diameter ranging from 8 μm to 25 μm and the coating particles have a particle diameter ranging from 0.1 μm to 5 μm.

In some embodiments, the coating particles are >0.0 wt. % and ≤30 wt. % of the cathode active material.

In some embodiments, one or both the base particle and the coating particles are doped with one or more of B, Mg, Al, Ca, Ti, V, Si, F, Cr, Cu, Zn, Zr, Mo and Ru.

In some embodiments, the cathode active material is coated with a metal oxide, a metal fluoride or a metal phosphate.

In some embodiments, the cathode active material has a pellet density of ≥3.4 g/cc.

In some embodiments, in the formula of the base particle, $0.8 \leq x \leq 1.0$.

In some embodiments, in the formula of the coating particles, b=0.

In some embodiments, the base particle has one of the following compositions: $Li_{1.02}Ni_{0.8}Mn_{0.1}Co_{0.1}O_2$, $Li_{1.02}Ni_{0.82}Mn_{0.11}Co_{0.07}O_2$ and $Li_{1.02}Ni_{0.94}Mn_{0.03}Co_{0.03}O_2$ and the coating particles have one of the following compositions: $Li_a Ni_{1/3}Mn_{1/3}Co_{1/3}O_2$, $Li_a Mn_{0.07}Ni_{0.07}Co_{0.86}O_2$, $Li_a Co_{0.96}Mn_{0.04}O_2$, and $Li_2 MnO_3$.

In some embodiments, the base particle has the one of the following composition: $Li_a Ni_{0.8}Co_{0.15}Al_{0.05}O_2$ and $Li_{1.02}Ni_{0.89}Co_{0.1}Al_{0.01}O_2$, and the coating particles have one of the following compositions: $Li_a Ni_{1/3}Mn_{1/3}Co_{1/3}O_2$, $Li_a Mn_{0.07}Ni_{0.07}Co_{0.86}O_2$, $Li_a Co_{0.96}Mn_{0.04}O_2$, and $Li_2 MnO_3$.

An aspect of the disclosed embodiments includes a battery cell having an anode comprising an anode current collector and an anode active material disposed over the anode current collector. The battery cell further comprises a cathode comprising a cathode current collector and a cathode active material disposed over the cathode current collector. The cathode active material comprises a base particle having the following formula: $Li_\alpha Ni_x M_y Co_z O_2$, wherein $0.95 \leq \alpha \leq 1.5$, $0.6 \leq x \leq 1.0$, $0 \leq y \leq 0.5$, $0 \leq z \leq 0.5$; $x+y+z=1$; and M is one of Mn and Al; and coating particles coating the base particle, the coating particles having the following formula: $Li_a Ni_b Mn_c Co_d O_2$, wherein $0.95 \leq a \leq 1.5$, $0 \leq b \leq 0.35$, $0 \leq c \leq 1.0$, $0 \leq d \leq 1.0$ and $b+c+d=1$.

Other aspects of the disclosed embodiments include methods of preparing the cathode active material. One method disclosed herein comprises forming a cathode precursor by coating a base precursor with a coating precursor, the base precursor being one of an oxide, hydroxide, carbonate or oxalate of $Ni_x M_y Co_z$, wherein $0.6 \leq x \leq 1.0$, $0 \leq y \leq 0.5$, $0 \leq z \leq 0.5$; $x+y+z=1$; and M is one of Mn and Al. The coating precursor is one of an oxide, hydroxide, carbonate or oxalate of $Ni_b Mn_c Co_d$, wherein $0 \leq b \leq 0.35$, $0 \leq c \leq 1.0$, $0 \leq d \leq 1.0$ and $b+c+d=1$. The cathode precursor is lithiated to produce cathode active materials with coating particles having the following formula: $Li_a Ni_b Mn_c Co_d O_2$, wherein $0.95 \leq a \leq 1.5$, $0 \leq b \leq 0.35$, $0 \leq c \leq 1.0$, $0 \leq d \leq 1.0$ and $b+c+d=1$, and base particles having the following formula: $Li_\alpha Ni_x M_y Co_z O_2$, wherein $0.95 \leq \alpha \leq 1.5$, $0.6 \leq x \leq 1.0$, $0 \leq y \leq 0.5$, $0 \leq z \leq 0.5$; $x+y+z=1$; and M is one of Mn and Al.

Another method of preparing the cathode active material comprises lithiating a base precursor, the base precursor being one of an oxide, hydroxide, carbonate or oxalate of $Ni_x M_y Co_z$, wherein $0.6 \leq x \leq 1.0$, $0 \leq y \leq 0.5$, $0 \leq z \leq 0.5$, $x+y+z=1$, and M is one of Mn and Al, forming a base particle. The base particle has the following formula: $Li_\alpha Ni_x M_y Co_z O_2$, wherein $0.95 \leq \alpha \leq 1.5$, $0.6 \leq x \leq 1.0$, $0 \leq y \leq 0.5$, $0 \leq z \leq 0.5$; $x+y+z=1$; and M is one of Mn and Al. The base particle is coated with a coating precursor, the coating precursor being one of an oxide, hydroxide, carbonate or oxalate of $Ni_b Mn_c Co_d$, wherein $0 \leq b \leq 0.35$, $0 \leq c \leq 1.0$, $0 \leq d \leq 1.0$ and $b+c+d=1$. The coating precursor is lithiated, producing coating particles having the following formula: $Li_a Ni_b Mn_c Co_d O_2$, wherein $0.95 \leq a \leq 1.5$, $0 \leq b \leq 0.35$, $0 \leq c \leq 1.0$, $0 \leq d \leq 1.0$; $b+c+d=1$.

Another method of preparing the cathode active material comprises lithiating a coating precursor to produce coating particles having the following formula: $Li_a Ni_b Mn_c Co_d O_2$, wherein $0.95 \leq a \leq 1.5$, $0 \leq b \leq 0.35$, $0 \leq c \leq 1.0$, $0 \leq d \leq 1.0$ and $b+c+d=1$. A base precursor is lithiated to produce base particles having the following formula: $Li_\alpha Ni_x M_y Co_z O_2$, wherein $0.95 \leq \alpha \leq 1.5$, $0.6 \leq x \leq 1.0$, $0 \leq y \leq 0.5$, $0 \leq z \leq 0.5$; $x+y+z=1$; and M is one of Mn and Al. The cathode active material is produced by coating the base particles with the coating particles.

In some embodiments, the method further comprises coating the cathode active material with a metal oxide, a metal fluoride or a metal phosphate.

In some embodiments, the method further comprises doping one or both the base particles and the coating particles with one or more of B, Mg, Al, Ca, Ti, V, Si, F, Cr, Cu, Zn, Zr, Mo and Ru.

DETAILED DESCRIPTION

Nickel-based oxides are a promising class of cathode materials for lithium-ion batteries. Nickel-rich oxides have high discharge capacities (200-220 mAh/g) and thus high gravimetric energy density, greater than the discharge capacities of conventional lithium-ion cathode materials, such as $LiCoO_2$ (140 mAh/g), $LiNi_{1/3}Co_{1/3}Mn_{1/3}O_2$ (160 mAh/g), and $LiMn_2O_4$ (120 mAh/g). Nickel as a raw material is also lower in cost than cobalt. However, nickel-rich cathode materials can experience significant capacity fade upon cycling, detrimental side reactions with electrolytes, and poor thermal stability. Nickel-rich materials can also suffer from oxygen evolution from its oxide lattice in the temperature range of 150° C.-300° C. when delithiated. The exothermic decomposition temperature gradually decreases as the nickel content increases.

For example, a cathode using the nickel-based material $LiNi_{1/3}Co_{1/3}Mn_{1/3}O_2$ exhibits high capacity retention and thermal stability among $LiNi_{1-2x}Co_xMn_xO_2$ samples, where $x<1/3$. By contrast, the cathode using $LiNi_{1/3}Co_{1/3}Mn_{1/3}O_2$ has a limited discharge capacity due to the lower amount of nickel. A cathode using nickel-rich material $LiNi_{1-2x}Co_xMn_xO_2$, where $x=0.2$, experiences severe capacity fading. The mechanism for the capacity fade can be due to the surface structural degradation as the nickel-rich material transforms to a rock salt structure.

Coatings have been introduced, attempting to improve the cycle retention, rate capability, and thermal stability of nickel-rich cathode materials. The coating materials introduced include carbon, metal oxides, metal carbonates, metal aluminates, metal phosphates, metal fluorides, metal oxyfluorides, and metal hydroxides. Surface coating nickel-rich material with these coating materials can protect the cathode surface from undesired chemical reactions with the organic electrolyte and suppress solid-electrolyte interphase (SEI) layer formation, scavenge trace amounts of hydrofluoric acid present in the electrolyte, and provide structural support to impede the transition to the rock salt phase.

However, these coating materials, including carbon, metal oxides, metal carbonates, metal aluminates, metal phosphates, metal fluorides, metal oxyfluorides, and metal hydroxides, are not able to participate in the electrochemical reaction, resulting in a decrease in initial capacity of lithium-ion batteries. These coating materials are also insulating with respect to lithium ions, slowing down, and even blocking, the de-intercalation of lithium ions.

Figure 1:
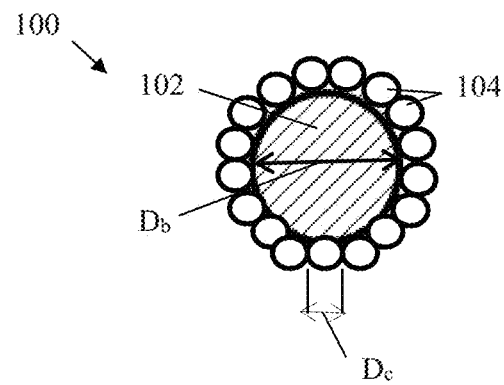
FIG. 1 is an illustration of an exemplary cathode active material.
Figure 2:
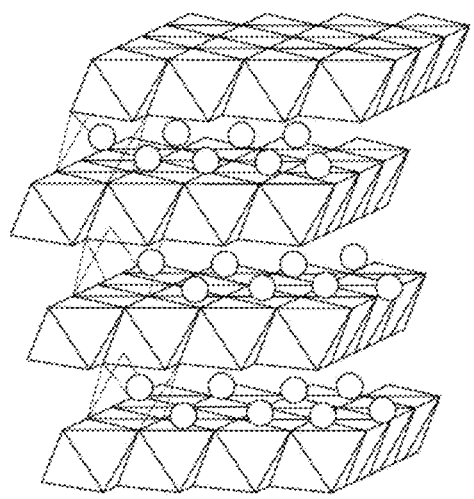
FIG. 2 is a schematic of the crystal structure of $LiMO_2$, where M=Ni, Co or Mn.
Figure 3:
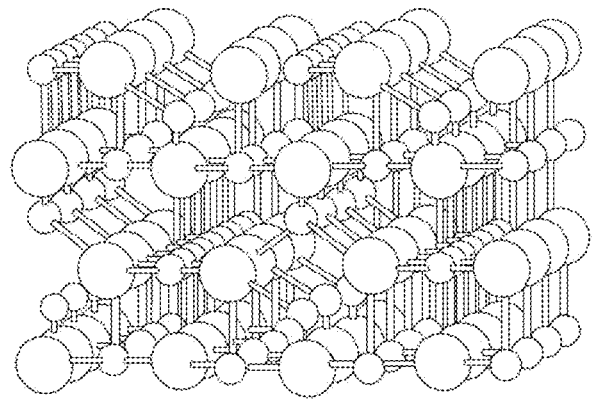
FIG. 3 is a schematic of the crystal structure of $Al_2O_3$.

The cathode active materials having a low nickel-based lithium-containing coating on a nickel-rich base as disclosed herein optimize the composition and microstructure of nickel-rich $LiNi_{1-2x}Co_xMn_xO_2$, particularly on the surface, to attain a cathode active material with high capacity and thermal stability. The disclosed low nickel-based lithium-containing coating on a nickel-rich base does not block the de-intercalation and re-intercalation of lithium. The low nickel-based lithium-containing coating participates in the charging/discharging electrochemical reaction, and is thus able to deliver capacity. The low nickel-based lithium-containing coating provides cycle stability (i.e., continual lithium-ion extraction and insertion), and results in better thermal stability of the resulting cathode active material. The low nickel-based lithium-containing coating particles have the same crystal structure as the nickel-rich lithium-containing base particle, but with different transition metals or different amounts of the same transition metals. This coherent crystal structure of the base and the coating provides increased mobility of lithium ions across the interface, resulting in better diffusion pathways. The improved contact between the base and coating particles due to the coherent structure reduces degradation of the material as a function of cycle number. As with conventional coatings, the low nickel-based coating also protects the surface of the nickel-rich base particle from undesired chemical reactions with the organic electrolyte and suppresses solid-electrolyte interphase (SEI) layer formation, scavenges trace amounts of hydrofluoric acid present in the electrolyte, and provides structural support to impede the transition to the rock salt phase FIG. 1 is a schematic of a cathode active material 100 that comprises a lithiated nickel-rich base particle 102 and lithiated low nickel-based coating particles 104 coating the base particle 102. FIG. 2 is a schematic of the crystal structure representing each of the base particle 102 and the coating particles 104. FIG. 3 is a schematic of the crystal structure of a conventional aluminum oxide coating. The crystal structure of the aluminum oxide coating is significantly different compared to the crystal structure of each of the base particle 102 and the coating particles 104.

The lithiated nickel-rich base particle 102 has the following formula: $Li_\alpha Ni_x M_y Co_z O_2$, wherein $0.95 \leq \alpha \leq 1.5$, $0.6 \leq x \leq 1.0$, $0 \leq y \leq 0.5$, $0 \leq z \leq 0.5$, in mol percent; $x+y+z=1$; and M is one of Mn and Al. In some embodiments, $0.8 \leq x \leq 1.0$, and in other embodiments, $0.9 \leq x \leq 1.0$. Non-limiting examples of base particle compositions include $Li_{1.02}Ni_{0.8}Mn_{0.1}Co_{0.1}O_2$, $Li_{1.02}Ni_{0.82}Mn_{0.11}Co_{0.07}O_2$, $Li_{1.02}Ni_{0.94}Mn_{0.03}Co_{0.03}O_2$, $Li_a Ni_{0.8}Co_{0.15}Al_{0.05}O_2$ and $Li_{1.02}Ni_{0.89}Co_{0.01}Al_{0.01}O_2$.

The cathode active material further comprises lithiated low nickel-based coating particles 104 coating the base particle 102. The coating particles 104 have the following formula: $Li_a Ni_b Mn_c Co_d O_2$, wherein $0.95 \leq a \leq 1.5$, $0 \leq b \leq 0.35$, $0 \leq c \leq 1.0$, $0 \leq d \leq 1.0$ and $b+c+d=1$. As used herein, "low nickel-based" coating particles 104 include coating particle compositions with no nickel. Non-limiting examples of coating particle compositions include $Li_a Ni_{1/3} Mn_{1/3} Co_{1/3} O_2$, $Li_a Mn_{0.07} Ni_{0.07} Co_{0.86} O_2$, $Li_a Co_{0.96} Mn_{0.04} O_2$, and $Li_2 MnO_3$.

A non-limiting example of a cathode active material 100 includes base particles 102 of $Li_{1.02}Ni_{0.8}Mn_{0.1}Co_{0.1}O_2$ coated with coating particles 104 of $Li_a Ni_{1/3} Mn_{1/3} Co_{1/3} O_2$. Another non-limiting example of a cathode active material 100 includes base particles 102 of $LiNi_{0.8}Co_{0.15}Al_{0.05}O_2$ coated with coating particles 104 of $LiNi_{0.07}Mn_{0.07}Co_{0.86}O_2$. Any combinations of base particles 102 having the following formula: $Li_\alpha Ni_x M_y Co_z O_2$, wherein $0.95 \leq \alpha \leq 1.5$, $0.6 \leq x \leq 1.0$, $0 \leq y \leq 0.5$, $0 \leq z \leq 0.5$; $x+y+z=1$; and M is one of Mn and Al and coating particles 104 have the following formula: $Li_a Ni_b Mn_c Co_d O_2$, wherein $0.95 \leq a \leq 1.5$, $0 \leq b \leq 0.35$, $0 \leq c \leq 1.0$, $0 \leq d \leq 1.0$ and $b+c+d=1$ are contemplated.

In some embodiments, the base particles 102 have a particle diameter $D_b$ ranging from 8 μm to 25 μm and the coating particles 104 have a particle diameter $D_c$ ranging from 0.1 μm to 5 μm. The coating particles 104 can form a uniform or non-uniform coating on part of or on an entire surface of the base particle 102. In some embodiments, the coating particles 104 are greater than 0.0 wt. % and less than or equal to 30 wt. % of the cathode active material 100. In some embodiments, the coating particles 104 are greater than 0.0 wt. % and less than or equal to 10.0 wt. % of the cathode active material 100. In some embodiments, the coating particles 104 are greater than 0.0 wt. % and less than or equal to 6.0 wt. % of the cathode active material 100.

The cathode active material 100 disclosed herein has a pellet density of ≥3.4 g/cc, which is typically higher than cathode materials made of nickel-rich material of the base particles alone.

In some embodiments, one or both the base particles 102 and the coating particles 104 are doped with a dopant to further enhance electrochemical performance, such as cycle life and thermal stability. The dopant can be one or more of B, Mg, Al, Ca, Ti, V, Si, F, Cr, Cu, Zn, Zr, Mo and Ru. In some embodiments, only the base particles 102 are doped. In some embodiments, only the coating particles 104 are doped. In some embodiments, both the base particles 102 and the coating particles 104 are doped. In such embodiments, the base particles 102 and the coating particles 104 can be doped with different elements or the same elements.

In some embodiments disclosed herein, the cathode active material 100 is coated with a metal oxide, a metal fluoride or a metal phosphate to further improve thermal stability and reduce gassing and swelling. The metal oxide, metal fluoride or metal phosphate can be zinc-based, boron-based, zirconium-based, aluminum-based, such as $Al_2O_3$, $AlF_3$, $AlPO_4$, and $ZrO_2$, as non-limiting examples. The thickness of the metal oxide, metal fluoride or metal phosphate coating may vary, while maintaining uniform protection of the surface of the material.

Figure 4:
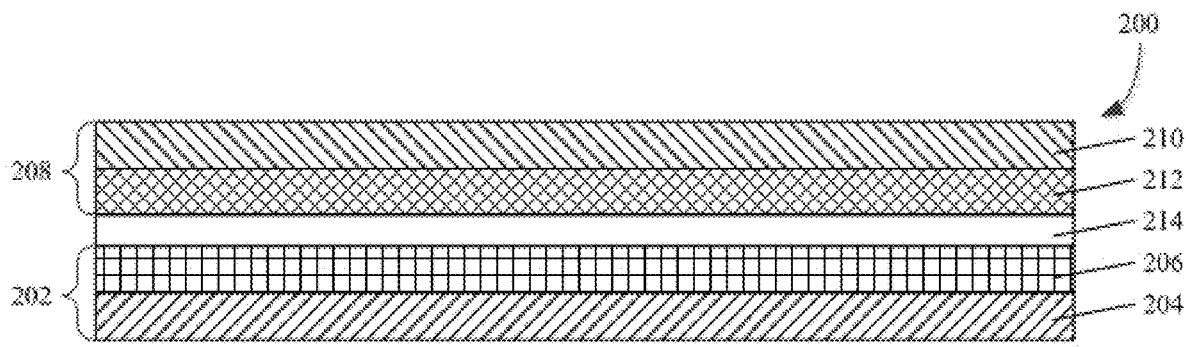
FIG. 4 is an illustration showing a cross-sectional view of an exemplary battery cell.

An aspect of the disclosed embodiments is a battery cell 200, the layers of which are shown in cross-section in FIG. 4. The battery cell 200 can be a bi-cell structure, jelly roll structure, pouch structure, or any other battery cell structure known to those skilled in the art. The battery cell 200 has an anode 202 with an anode current collector 204 and an anode active material 206 disposed over the anode current collector 204. The battery cell 200 also has a cathode 208 with a cathode current collector 210 and a cathode active material 212 disposed over the cathode current collector 210. The cathode active material 212 and the anode active material 206 are separated by a separator 214. The cathode active material 212 is one of the embodiments of the cathode active material 100 disclosed herein. The layers may be wound or stacked to create the battery cell 200. As non-limiting examples, the cathode current collector 210 may be aluminum foil, the anode current collector 204 may be copper foil, and the separator 214 may include a conducting polymer electrolyte. The anode active material 206 can be carbon. A battery pack is a plurality of battery cells 200 that can generally be used in any type of electronic device.

Figure 5:
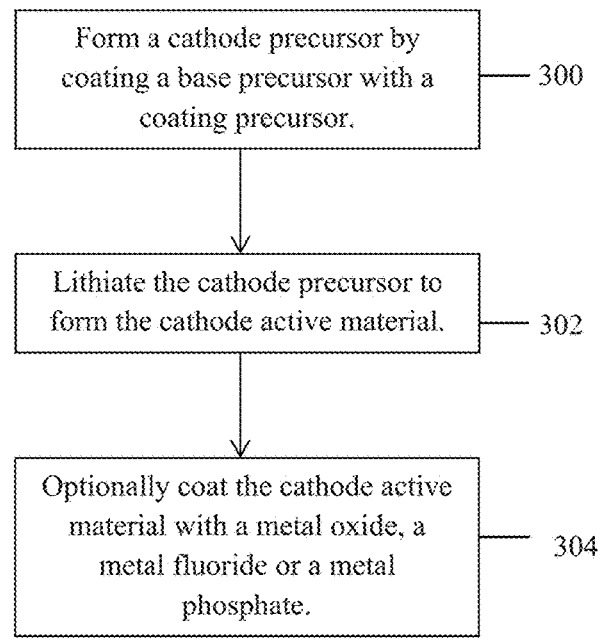
FIG. 5 is a flow diagram of an embodiment of methods of preparing the cathode active material.
Figure 6:
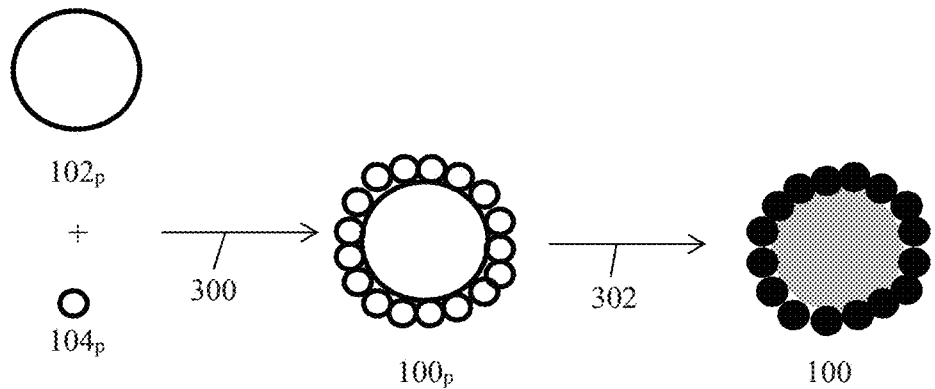
FIG. 6 is a schematic of the embodiment of methods of preparing the cathode active material of FIG. 5.

Other aspects of the disclosed embodiments include methods of preparing the cathode active material 100. FIG. 5 is a flow diagram of one method disclosed herein, which is schematically represented in FIG. 6. In step 300, a cathode precursor $100_p$ is formed by coating a base precursor $102_p$ with a coating precursor $104_p$. The base precursor $100_p$ is one of an oxide, hydroxide, carbonate or oxalate of $Ni_x M_y Co_z$, wherein $0.6 \leq x \leq 1.0$, $0 \leq y \leq 0.5$, $0 \leq z \leq 0.5$; $x+y+z=1$; and M is one of Mn and Al. Non-limiting examples of the base precursor $102_p$ include $Ni_{0.8}Mn_{0.1}Co_{0.1}O_2$, $Ni_{0.6}Mn_{0.2}Co_{0.2}O_2$, $Ni_{0.8}Co_{0.15}Al_{0.05}O_2$, $Ni_{0.8}Co_{0.15}Al_{0.05}(OH)_2$, $Ni_{0.8}Mn_{0.1}Co_{0.1}(OH)_2$, and $Ni_{0.6}Mn_{0.2}Co_{0.2}(OH)_2$. The coating step can be achieved with a high-speed coater or calcination, as non-limiting examples.

The coating precursor is one of an oxide, hydroxide, carbonate or oxalate of $Ni_b Mn_c Co_d$, wherein $0 \leq b \leq 0.35$, $0 \leq c \leq 1.0$, $0 \leq d \leq 1.0$ and $b+c+d=1$. Non-limiting examples of the coating precursor $104_p$ include $Ni_{1/3}Mn_{1/3}Co_{1/3}O_2$, $Mn_{0.07}Ni_{0.07}Co_{0.86}O_2$, $Ni_{1/3}Mn_{1/3}Co_{1/3}(OH)_2$, and $Mn_{0.07}Ni_{0.07}Co_{0.86}(OH)_2$.

The cathode precursor $100_p$ is lithiated in step 302 to produce the cathode active material 100 with coating particles 104 having the following formula: $Li_aNi_bMn_cCo_dO_2$, wherein $0.95 \leq a \leq 1.5$, $0 \leq b \leq 0.35$, $0 \leq c \leq 1.0$, $0 \leq d \leq 1.0$ and $b+c+d=1$, and the base particles 102 having the following formula: $Li_\alpha Ni_xM_yCo_zO_2$, wherein $0.95 \leq \alpha \leq 1.5$, $0.6 \leq x \leq 1.0$, $0 \leq y \leq 0.5$, $0 \leq z \leq 0.5$; $x+y+z=1$; and M is one of Mn and Al.

In some embodiments, the method further comprises coating the cathode active material 100 with the metal oxide, the metal fluoride or the metal phosphate, as shown in optional step 304 in FIG. 5.

In some embodiments, the method further comprises doping one or both the base particles 102 and the coating particles 104 with the dopants discussed herein. In some embodiments, only the base particles 102 are doped. In some embodiments, only the coating particles 104 are doped. In some embodiments, both the base particles 102 and the coating particles 104 are doped. The doping can occur to the base precursor $102_p$ and/or the coating precursor $104_p$ prior to lithiation. The doping can alternatively occur during lithiation of the base precursor $102_p$ and/or the coating precursor $104_p$.

Figure 7:
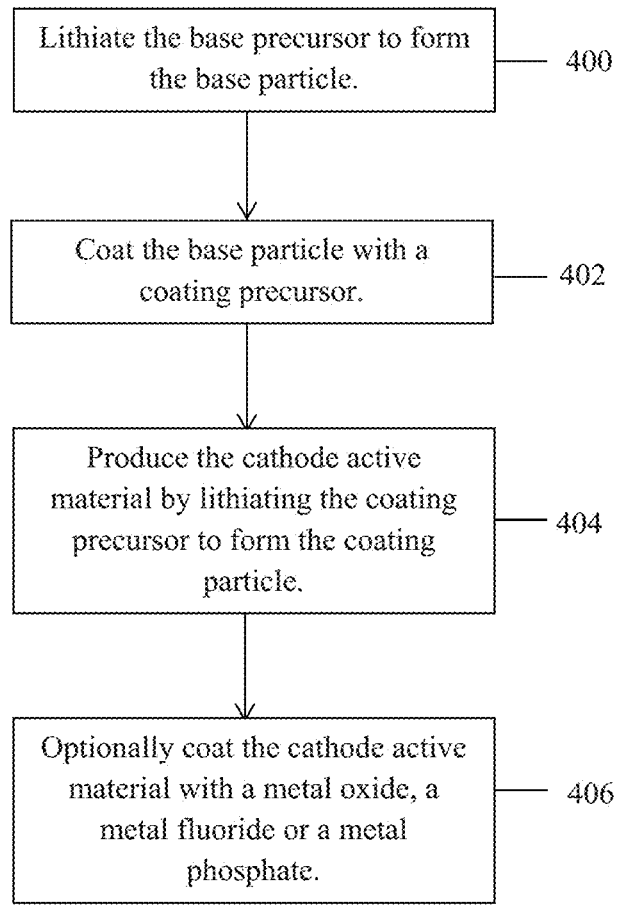
FIG. 7 is a flow diagram of another embodiment of methods of preparing the cathode active material.
Figure 8:
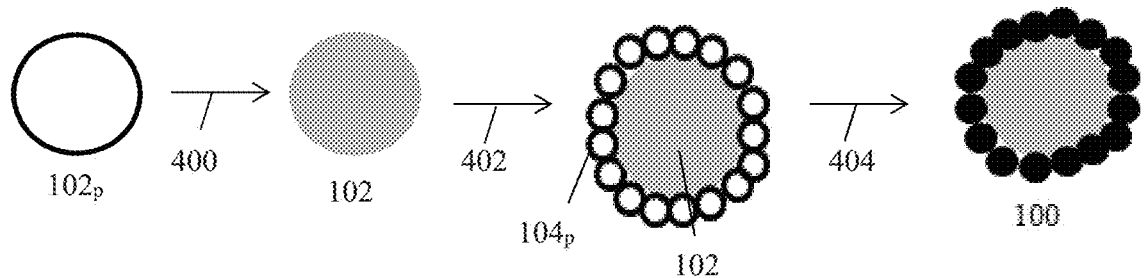
FIG. 8 is a schematic of the embodiment of methods of preparing the cathode active material of FIG. 7.

FIG. 7 is a flow diagram of another method disclosed herein, which is schematically represented in FIG. 8. The same reference numbers will be used for the same particles for clarity. In step 400, the base precursor $102_p$ is lithiated, the base precursor $102_p$ being one of an oxide, hydroxide, carbonate or oxalate of $Ni_xM_yCo_z$, wherein $0.6 \leq x \leq 1.0$, $0 \leq y \leq 0.5$, $0 \leq z \leq 0.5$, $x+y+z=1$, and M is one of Mn and Al, forming the base particle 102. The base particle 102 is coated in step 402 with the coating precursor $104_p$, the coating precursor $104_p$ being one of an oxide, hydroxide, carbonate or oxalate of $Ni_bMn_cCo_d$, wherein $0 \leq b \leq 0.35$, $0 \leq c \leq 1.0$, $0 \leq d \leq 1.0$ and $b+c+d=1$. The coating precursor $104_p$ is lithiated in step 404, producing coating particles 104 having the following formula: $Li_aNi_bMn_cCo_dO_2$, wherein $0.95 \leq a \leq 1.5$, $0 \leq b \leq 0.35$, $0 \leq c \leq 1.0$, $0 \leq d \leq 1.0$; $b+c+d=1$.

In some embodiments, the method further comprises coating the cathode active material 100 with the metal oxide, the metal fluoride or the metal phosphate, as shown in optional step 406 in FIG. 7.

In some embodiments, the method further comprises doping one or both the base particles 102 and the coating particles 104 with the dopants discussed herein. In some embodiments, only the base particles 102 are doped. In some embodiments, only the coating particles 104 are doped. In some embodiments, both the base particles 102 and the coating particles 104 are doped.

Figure 9:
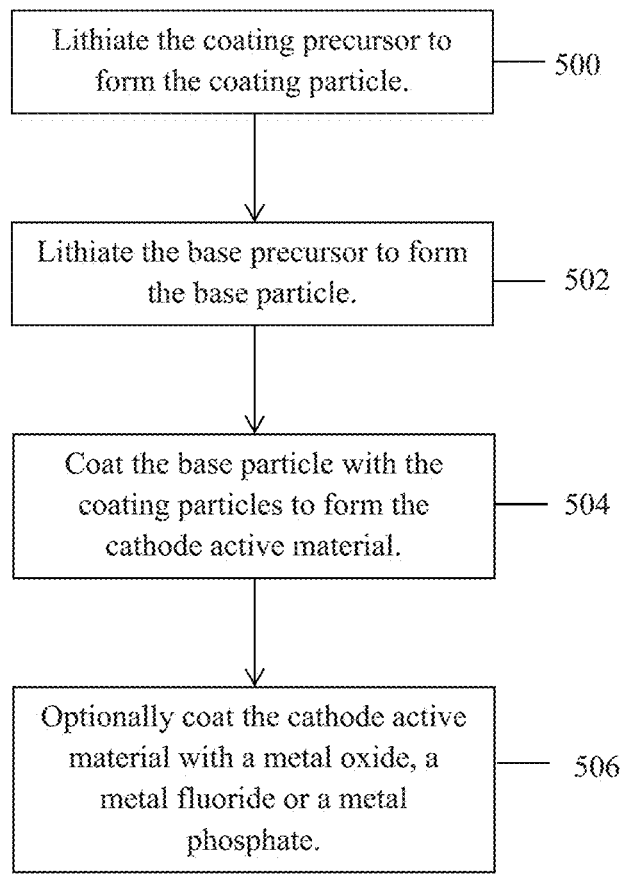
FIG. 9 is a flow diagram of another embodiment of methods of preparing the cathode active material.
Figure 10:
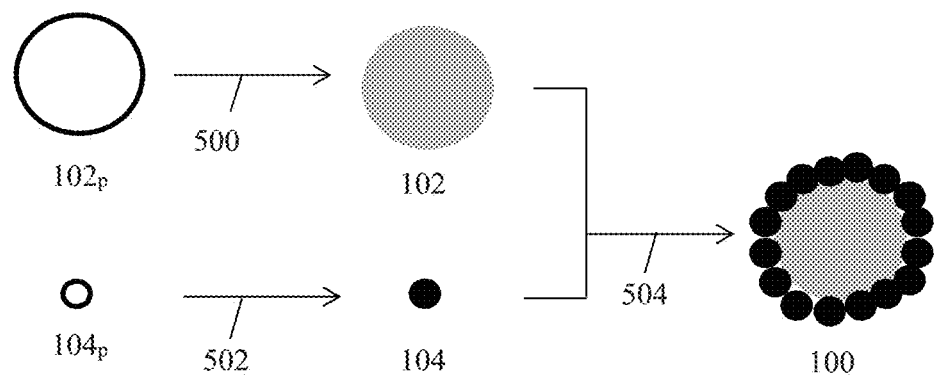
FIG. 10 is a schematic of the embodiment of methods of preparing the cathode active material of FIG. 9.

FIG. 9 is a flow diagram of another method disclosed herein, which is schematically represented in FIG. 10. The same reference numbers will be used for the same particles for clarity. In step 500, the coating precursor $104_p$ is lithiated to produce coating particles 104 having the following formula: $Li_aNi_bMn_cCo_dO_2$, wherein $0.95 \leq a \leq 1.5$, $0 \leq b \leq 0.35$, $0 \leq c \leq 1.0$, $0 \leq d \leq 1.0$ and $b+c+d=1$. The base precursor $102_p$ is lithiated in step 502 to produce base particles 102 having the following formula: $Li_\alpha Ni_xM_yCo_zO_2$, wherein $0.95 \leq \alpha \leq 1.5$, $0.6 \leq x \leq 1.0$, $0 \leq y \leq 0.5$, $0 \leq z \leq 0.5$; $x+y+z=1$; and M is one of Mn and Al. The cathode active material 100 is produced in step 504 by coating the base particles 102 with the coating particles 104.

In some embodiments, the method further comprises coating the cathode active material 100 with the metal oxide, the metal fluoride or the metal phosphate, as shown in optional step 506 in FIG. 9.

In some embodiments, the method further comprises doping one or both of the base particles 102 and the coating particles 104 with the dopants discussed herein. In some embodiments, only the base particles 102 are doped. In some embodiments, only the coating particles 104 are doped. In some embodiments, both the base particles 102 and the coating particles 104 are doped.

EXAMPLES

A cathode was prepared with 90 wt. % active material, 5 wt. % binder and 5 wt. % carbon. The anode was prepared with graphite from ATL Gen 4 (Zichen G1). The ratio of anode to cathode material (N:P)=1.05-1.11, and the electrolyte was 1.2 M LiPF6 in ethylenecarbonate (EC) and ethylmethylcarbonate (EMC), EC:EMC (3:7 by wt.)+1 wt. % vinylene carbonate+2 wt. % 1.3-propane sultone.

For the following examples, the charge capacity was measured by charging the cell to 4.3 V using a rate of 0.1 C followed by a CVC step to C/40. The discharge capacity and average voltage were measured by discharging the cell to 2.5 V at a rate of 0.1 C. The first coulombic efficiency is the ratio of the discharge and charge capacities. The gravimetric energy density is the discharge capacity multiplied by the average discharge voltage and the volumetric energy density is the gravimetric energy density multiplied by the pellet density.

Example 1

Figure 11:
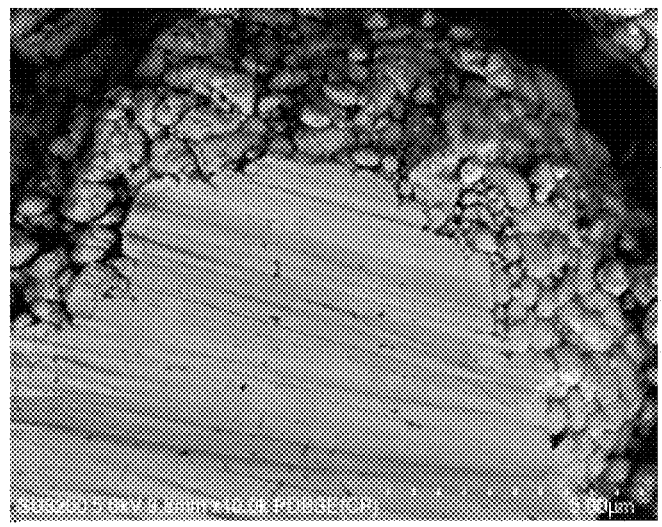
FIG. 11 is a scanning electron microscope (SEM) image of a cross section of a cathode active material particle of Example 1.

A representative cathode active material was produced with a base particle of $Li_{1.02}Ni_{0.8}Co_{0.1}Mn_{0.1}O_2$ having a D50 particle diameter of 15 μm and a coating material of $Li_{1.01}Co_{0.96}Mn_{0.04}O_2$ having a D50 particle diameter of 0.17 μm. The coating material was 4 wt. % of the cathode active material. The elemental analysis of the cathode active material was $Li_{1.02}Ni_{0.76}Co_{0.14}Mn_{0.1}O_2$. The cathode active material was coated with 1000 ppm $Al_2O_3$. FIG. 11 is an SEM image of a cross section of a cathode active material particle.

As shown in Table 1, the pellet density of the cathode active material is 3.49 g/cc, greater than the pellet density of the base particle alone. The volumetric energy density is 2651 Wh/L, also greater than the volumetric energy density realized with the base particle material without the low-nickel lithium-containing coating. The first coulombic efficiency is greater for the cathode active material than for the base particle material alone, indicating an increase in the reversible capacity when cathode active material is used. The discharge capacity of the cathode active material is unaffected at 197 mAh/g.

TABLE 1

| Description | Cathode Active Material | Base particle |
|---|---|---|
| Nickel, mol. % | 76.0 | 80.0 |
| Coating nickel mol. % = 0 | | |
| Coating, ppm | $Al_2O_3$, 1000 ppm | |
| Volumetric Energy Density at 4.3 V, Wh/L | 2651 | 2582 |
| Gravimetric Energy Density at 4.3 V, mWh/g | 761 | 761 |

TABLE 1-continued

| Description | Cathode Active Material | Base particle |
|---|---|---|
| Charge Capacity, mAh/g (0.1 C, CVC until C/40) | 221 | 225 |
| Discharge Capacity, mAh/g (0.1 DC to 2.5 V) | 197 | 197 |
| 1st Coulombic Efficiency (0.1 C/0.1 DC) to 4.3 V, % | 89.3 | 87.5 |
| Average Discharge Voltage, 0.1 C/0.1 DC, 4.3 V to 2.5 V, (V) | 3.86 | 3.86 |
| Pellet Density, g/cc (200 MPa unloaded) | 3.49 | 3.39 |
| PSD: d50, microns | 13 | 15 |
| BET Surface Area, m$^2$/g | 0.38 | 0.24 |

Figure 12A:
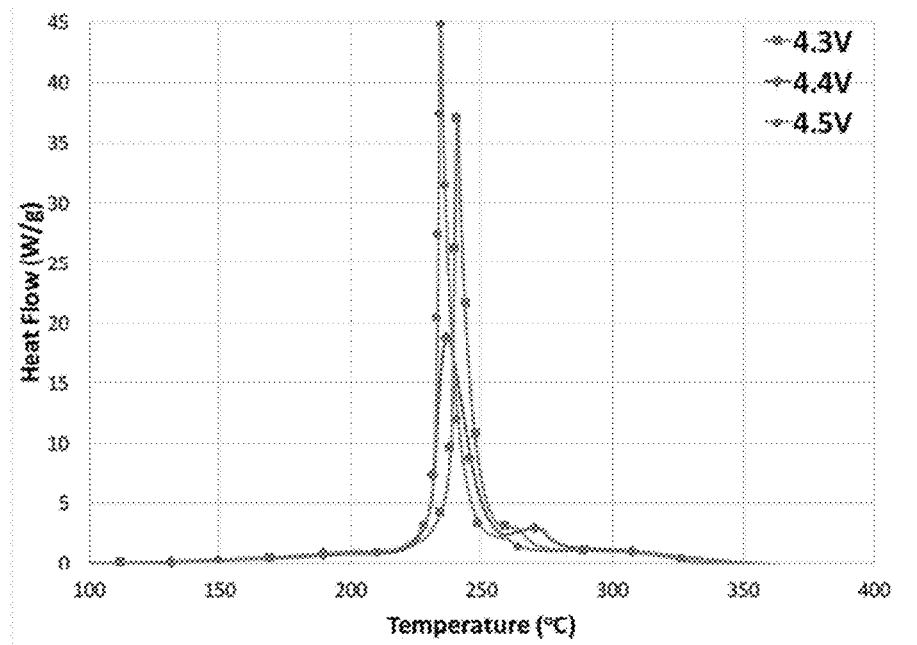
FIGS. 12A and 12B are graphs of the thermal runaway of each of the cathode active material and the base particle material, respectively, of Example 1.
Figure 12B:
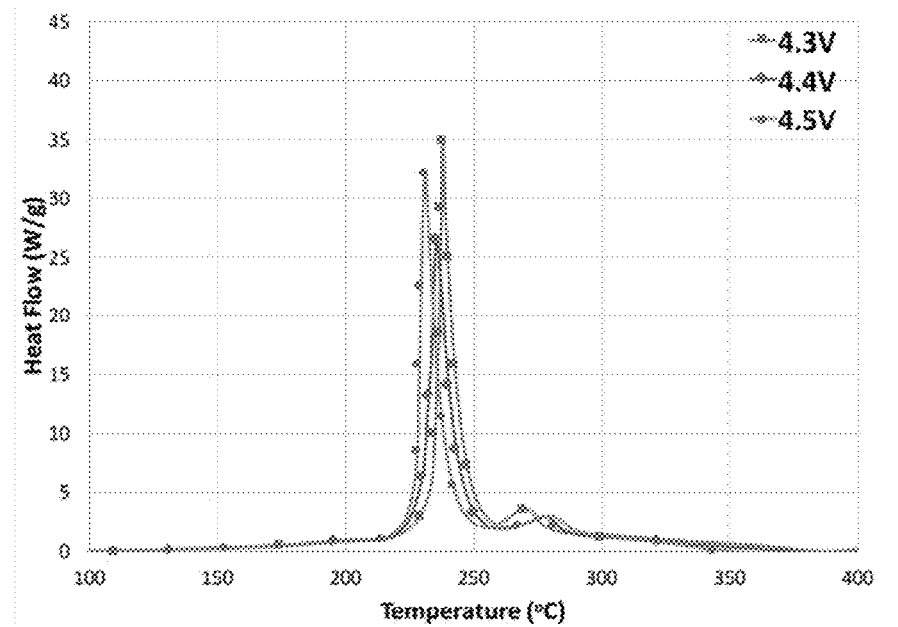

FIGS. 12A and 12B are graphs of the thermal runaway of each of the cathode active material and the base particle material, respectively. As shown, the thermal runaway is delayed by approximately 3° C. when using the cathode active material rather than using the base particle material alone, illustrating the increased thermal stability of the cathode active material when compared to the base particle material alone. Table 2 lists the thermal runaway onset temperature for three upper cutoff voltages, as well as the discharge capacity at the three upper cutoff voltages for each of the cathode active material and the base particle material.

TABLE 2

| Material | Cutoff voltage | Capacity (mAh/g) | T$_{onset}$ (° C.) |
|---|---|---|---|
| Cathode active material | 4.3 V | 196 | 240 |
| | 4.4 V | 205 | 234 |
| | 4.5 V | 213 | 231 |
| Base particle material | 4.3 V | 192 | 237 |
| | 4.4 V | 200 | 232 |
| | 4.5 V | 210 | 227 |

Figure 13:
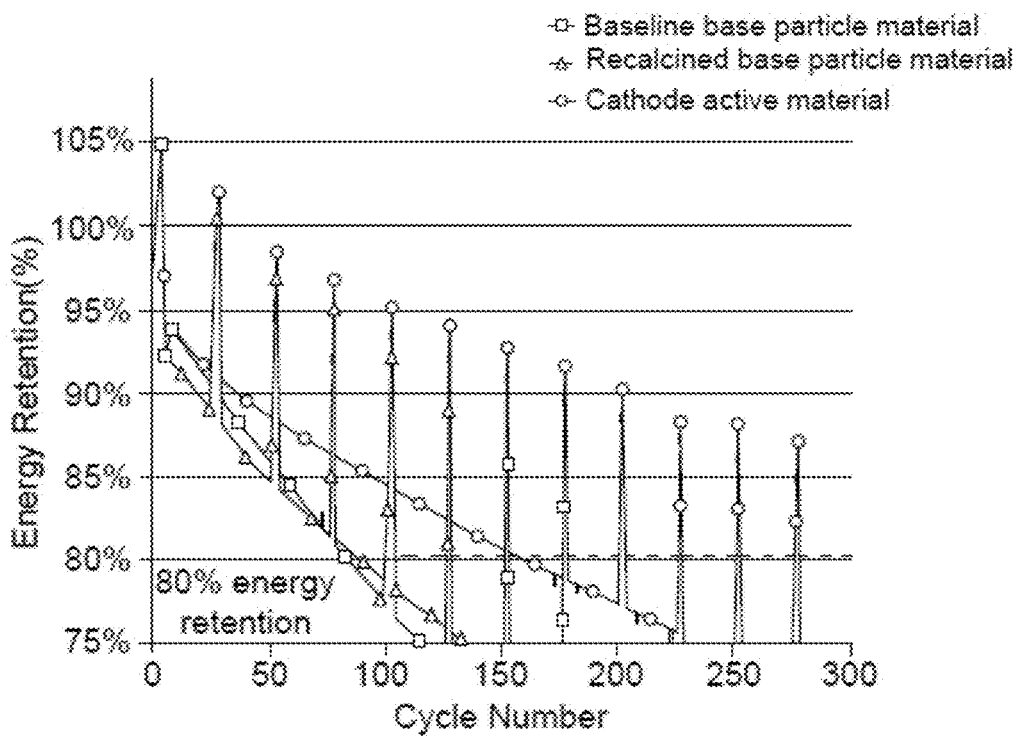
FIG. 13 is a graph showing energy retention versus cycle number for the cathode active material of Example 1 and the base particle materials of Example 1.
Figure 14:
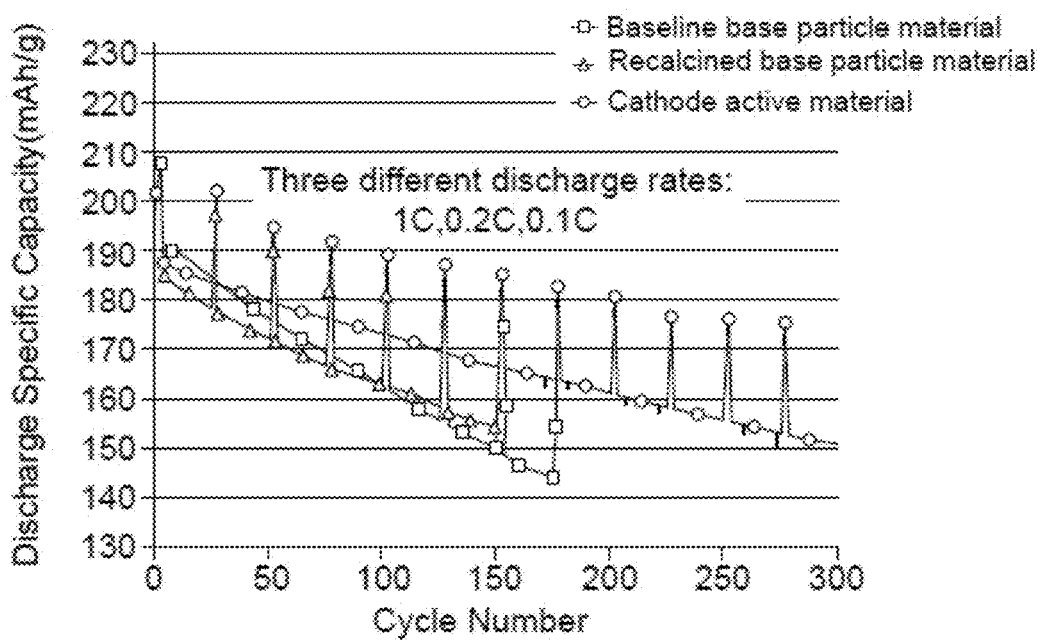
FIG. 14 is a graph showing the discharge specific capacity versus cycle number for the cathode active material and the base particle materials of Example 1.
Figure 15:
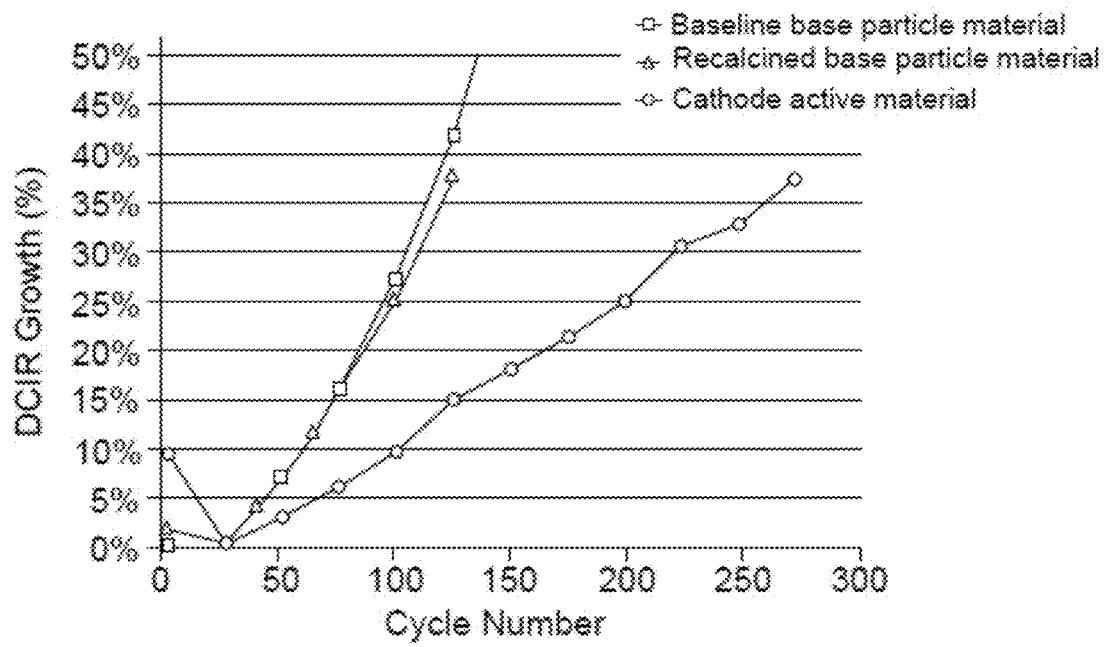
FIG. 15 is a graph showing the direct current resistance (DCR) growth versus cycle number for the cathode active material and base particle materials of Example 1.
Figure 16:
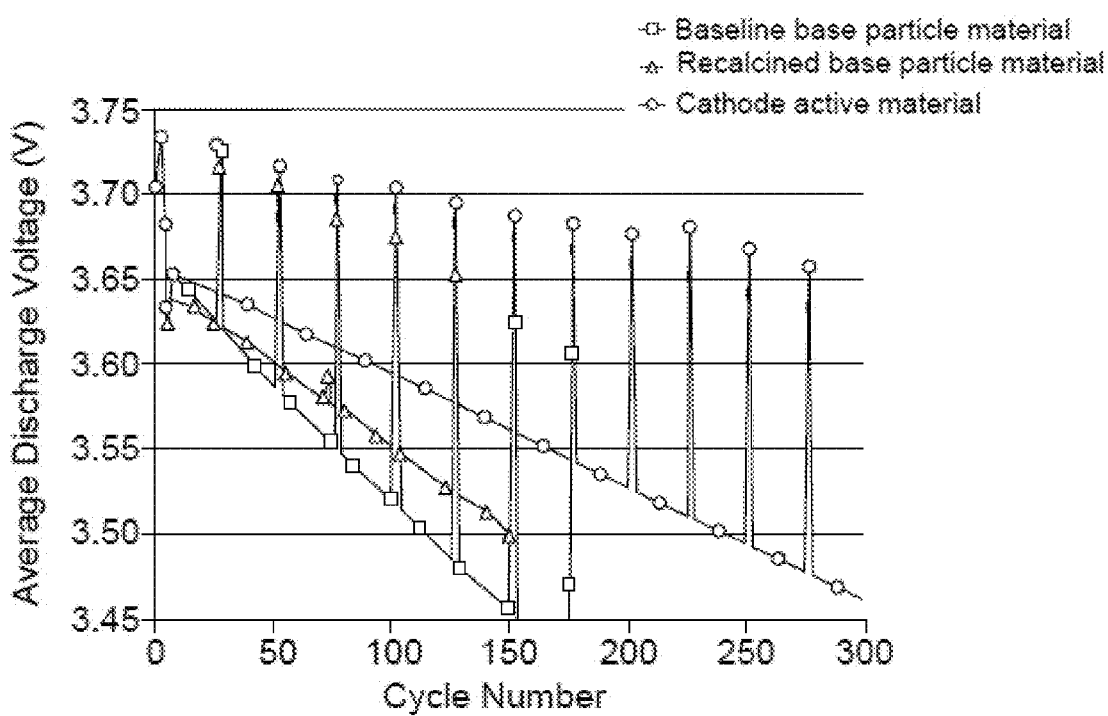
FIG. 16 is a graph showing the average discharge voltage versus cycle number for the cathode active material and base particle materials of Example 1.
Figure 17:
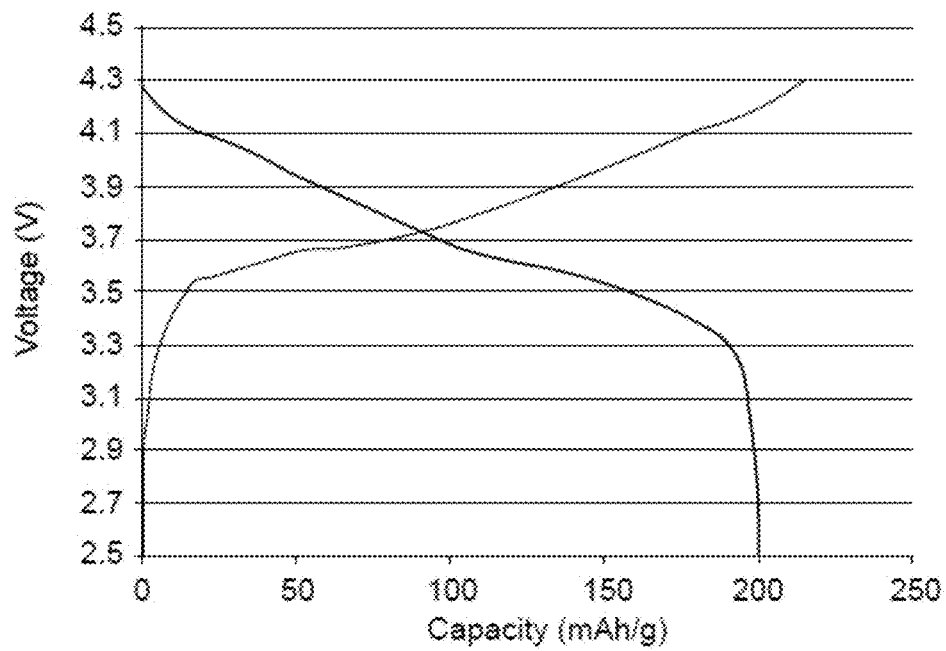
FIG. 17 is a charge/discharge profile for the cathode active material of Example 1.

FIGS. 13-17 are graphs of additional testing results of the materials in Example 1, showing the improved energy retention and reduced capacity fade realized with the cathode active material having the high-nickel base with low-nickel lithium containing coating. Each of FIGS. 13-16 include data for a baseline base particle that has not been recalcined, a recalcined base particle that has been calcined at 700° C., and the cathode active material that has been calcined at 700° C. FIG. 13 shows the slower decline in energy retention versus cycle number for the cathode active material when compared to either the baseline or recalcined base particle material. FIG. 14 shows the reduction in capacity degradation as a function of cycle number when the cathode active material is used. FIG. 15 shows the slow-down in the growth of direct current resistance (DCR) for the cathode active material versus either the base or the recalcined base particle material. FIG. 16 shows the improved retention of average discharge voltage as a function of cycle number for the cathode active material when compared to the base particle material alone, both baseline and recalcined. FIG. 17 is a charge/discharge profile for the cathode active material of Example 1. As shown, the cathode active material delivers about 219 mAh/g charge capacity and 200 mAh/g discharge capacity with an average discharge voltage of 3.72 V.

There is significant improvement in cycle stability when the cathode active material is used when compared to the base particle material alone and the recalcined base particle material alone. The cycle life (defined as reaching 80% of the beginning of life energy) nearly doubles for the cathode active material, from 180 cycles (200 cycles for the recalcined) to 350 cycles compared to the base particle material alone.

Figure 18:
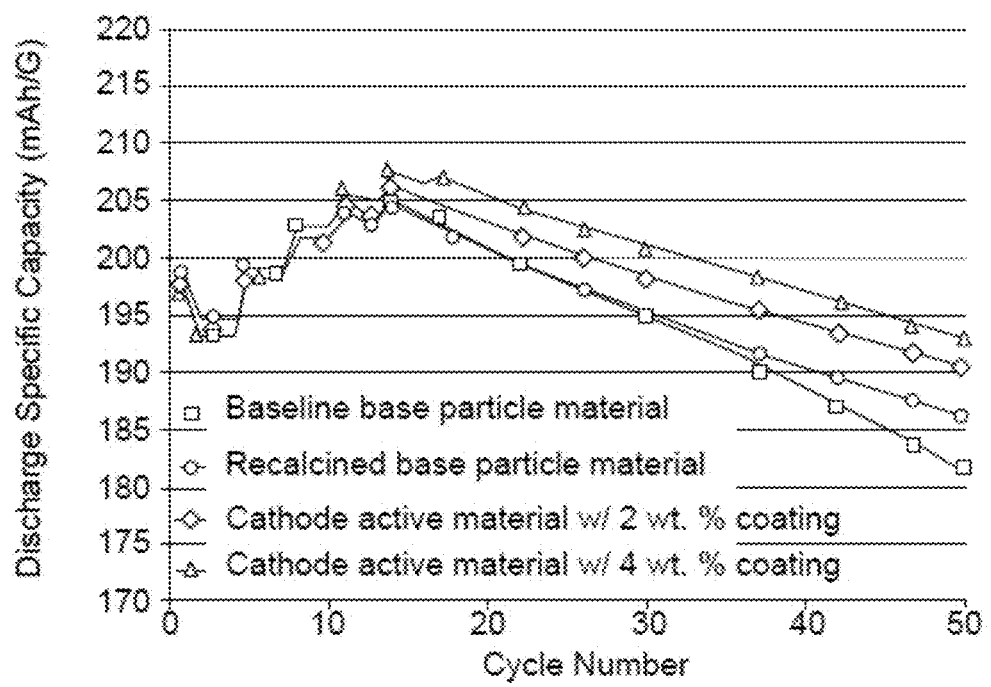
FIG. 18 compares the change in discharge specific capacity as a function of cycle number for two cathode active materials, one having 2 wt. % coating and the other having 4 wt. % coating.
Figure 19:
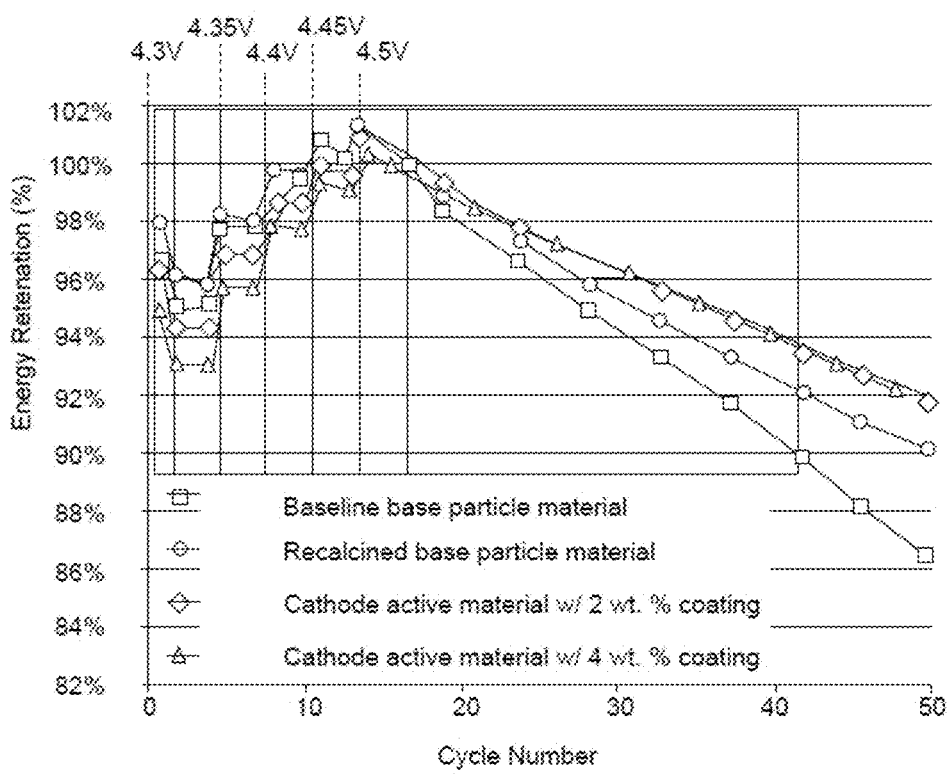
FIG. 19 compares the change in energy retention as a function of cycle number for the two cathode active materials of FIG. 18.

FIGS. 18 and 19 compare the cathode active material of Example 1 with the coating particles as 2 wt. % of the cathode active material and 4 wt. % of the cathode active material. These active cathode materials, both calcined at 700° C., are compared to the baseline base particle material alone as well as the recalcined base particle material alone. FIG. 18 compares the capacity degradation as cycles increase, with each of the cathode active materials showing reduced degradation than either the baseline or recalcined base particle material alone. FIG. 19 shows the increase in energy retention at 25 cycles for each of the cathode active materials compared to each of the baseline and recalcined base particle materials. The energy retention at 25 cycles for the 2 wt. % coated cathode active material and the 4 wt. % coated cathode active material is 93.8% for both, while the energy retention at 25 cycles for the baseline base particle material is 89.9%.

Example 2

Another representative cathode active material was produced with a base particle doped with 1% Mg with a composition of $Li_{1.02}Ni_{0.94}Co_{0.02}Mn_{0.03}Mg_{0.01}O_2$ having a D50 particle diameter of 18 μm coated with a coating material of $Li_{1.01}Co_{0.96}Mn_{0.04}O_2$ having a D50 particle diameter of 0.17 μm. The coating material was 4 wt. % of the cathode active material. The elemental analysis of the cathode active material was $Li_{1.03}Ni_{0.90}Co_{0.06}Mn_{0.03}Mg_{0.01}O_2$. The cathode active material was coated with 1000 ppm $Al_2O_3$.

As shown in Table 3, the pellet density of the cathode active material is 3.41 g/cc, greater than the pellet density of the base particle alone. The first coulombic efficiency is greater for the cathode active material than for the base particle material alone, indicating an increase in the reversible capacity when the cathode active material is used. The discharge capacity of the cathode active material is greater than that for the base particle material alone, 205 mAh/g versus 202 mAh/g. The volumetric energy density is 2688 Wh/L, also greater than the volumetric energy density realized with the base particle material without the coating.

TABLE 3

| Description | Cathode Active Material | Base particle |
|---|---|---|
| Nickel, mol. % | 90.0 | 94.0 |
| Coating nickel mol. % = 0 | | |
| Dopant | | 1% Mg |
| Coating, ppm | $Al_2O_3$, 1000 ppm | |
| Volumetric Energy Density at 4.3 V, Wh/L | 2688 | 2618 |
| Gravimetric Energy Density at 4.3 V, mWh/g | 787 | 778 |
| Charge Capacity, mAh/g (0.1 C, CVC until C/40) | 235 | 236 |
| Discharge Capacity, mAh/g (0.1 DC to 2.5 V) | 205 | 202 |
| 1st Coulombic Efficiency (0.1 C/0.1 DC) to 4.3 V, % | 87.2 | 85.8 |
| Average Discharge Voltage, 0.1 C/0.1 DC, 4.3 V to 2.5 V, (V) | 3.84 | 3.84 |
| Pellet Density, g/cc (200 MPa unloaded) | 3.41 | 3.37 |
| PSD: d50, microns | 17 | 18 |
| BET Surface Area, m$^2$/g | 0.26 | 0.28 |

Figure 20:
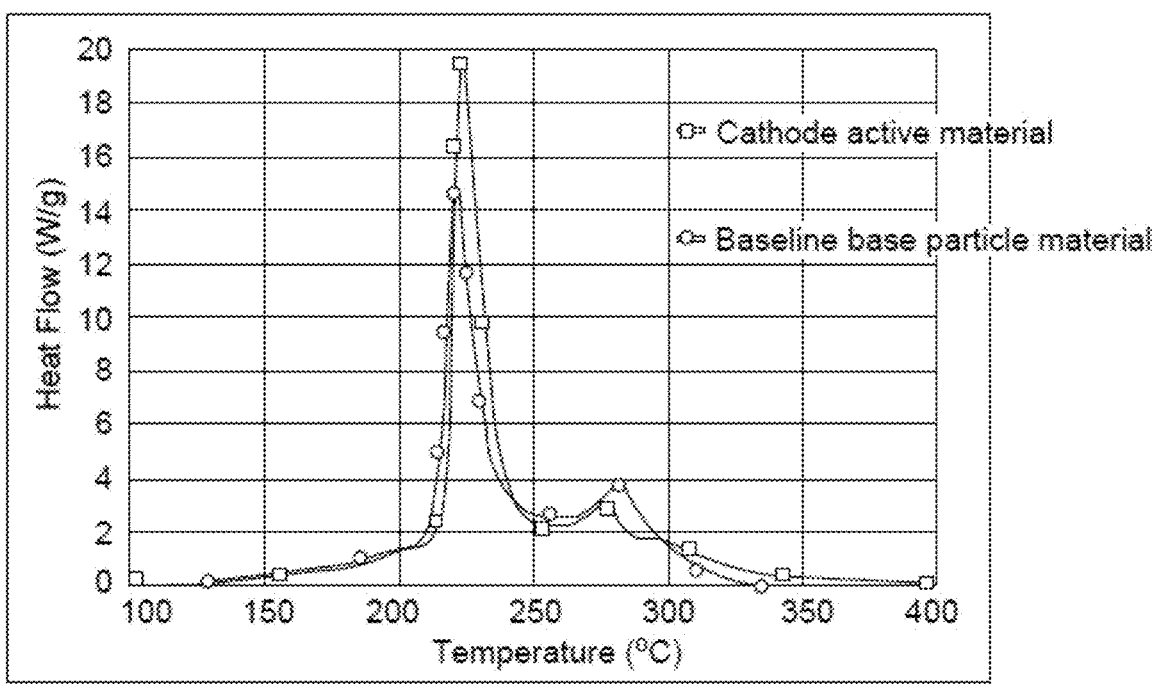
FIG. 20 is a graph of the thermal runaway of each of the cathode active material and the base particle material of Example 2.

FIG. 20 is a graph of the thermal runaway of each of the cathode active material and the base particle material. As shown, the thermal runaway is delayed by approximately 4° C. when using the cathode active material rather than using the base particle material alone, illustrating the increased thermal stability of the cathode active material when compared to the base particle material alone.

Example 3

Another representative cathode active material was produced with a base particle having a composition of $Li_{1.02}Ni_{0.89}Co_{0.1}Al_{0.01}O_2$ with a D50 particle diameter of 22 μm coated with a coating material of $Li_{1.01}Co_{0.96}Mn_{0.04}O_2$ having a D50 particle diameter of 0.17 μm. The coating material was 4 wt. % of the cathode active material. The elemental analysis of the cathode active material was $Li_{0.99}Ni_{0.85}Co_{0.12}Al_{0.01}O_2$. The cathode active material was coated with 1000 ppm $Al_2O_3$.

As shown in Table 4, the pellet density of the cathode active material is 3.48 g/cc, unchanged from the pellet density of the base particle alone. The first coulombic efficiency is greater for the cathode active material than for the base particle material alone, indicating an increase in the reversible capacity when the cathode active material is used.

TABLE 4

| Description | Cathode Active Material | Base particle |
|---|---|---|
| Nickel, mol. % | 85.0 | 89.0 |
| Coating nickel mol. % = 0 | | |
| Coating, ppm | $Al_2O_3$, 1000 ppm | |
| Volumetric Energy Density at 4.3 V, Wh/L | 2623 | 2674 |
| Gravimetric Energy Density at 4.3 V, mWh/g | 754 | 769 |
| Charge Capacity, mAh/g (0.1 C, CVC until C/40) | 228 | 233 |
| Discharge Capacity, mAh/g (0.1 DC to 2.5 V) | 197 | 200 |
| 1st Coulombic Efficiency (0.1 C/0.1 DC) to 4.3 V, % | 86.0 | 85.7 |
| Average Discharge Voltage, 0.1 C/0.1 DC, 4.3 V to 2.5 V, (V) | 3.84 | 3.84 |
| Pellet Density, g/cc (200 MPa unloaded) | 3.48 | 3.48 |
| PSD: d50, microns | 23 | 22 |
| BET Surface Area, m²/g | 0.20 | 0.21 |

Figure 21:
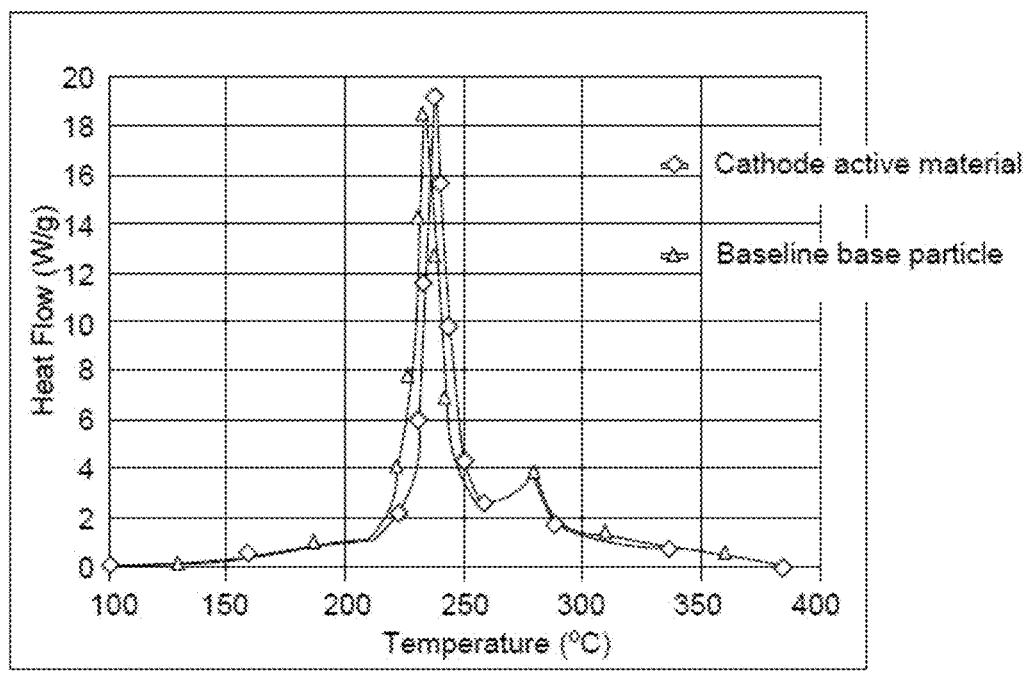
FIG. 21 is a graph of the thermal runaway of each of the cathode active material and the base particle material of Example 3.

FIG. 21 is a graph of the thermal runaway of each of the cathode active material and the base particle material. As shown, the thermal runaway is delayed by approximately 5° C. when using the cathode active material rather than using the base particle material alone, illustrating the increased thermal stability of the cathode active material when compared to the base particle material alone.

Figure 22:
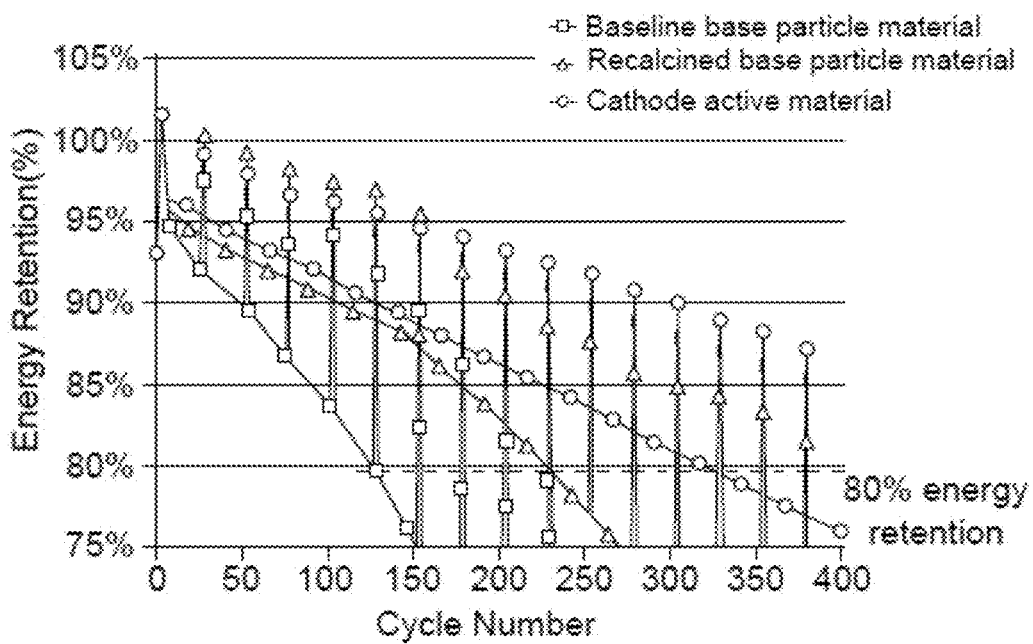
FIG. 22 is a graph showing energy retention versus cycle number for the cathode active material of Example 3 and the base particle materials of Example 3.
Figure 23:
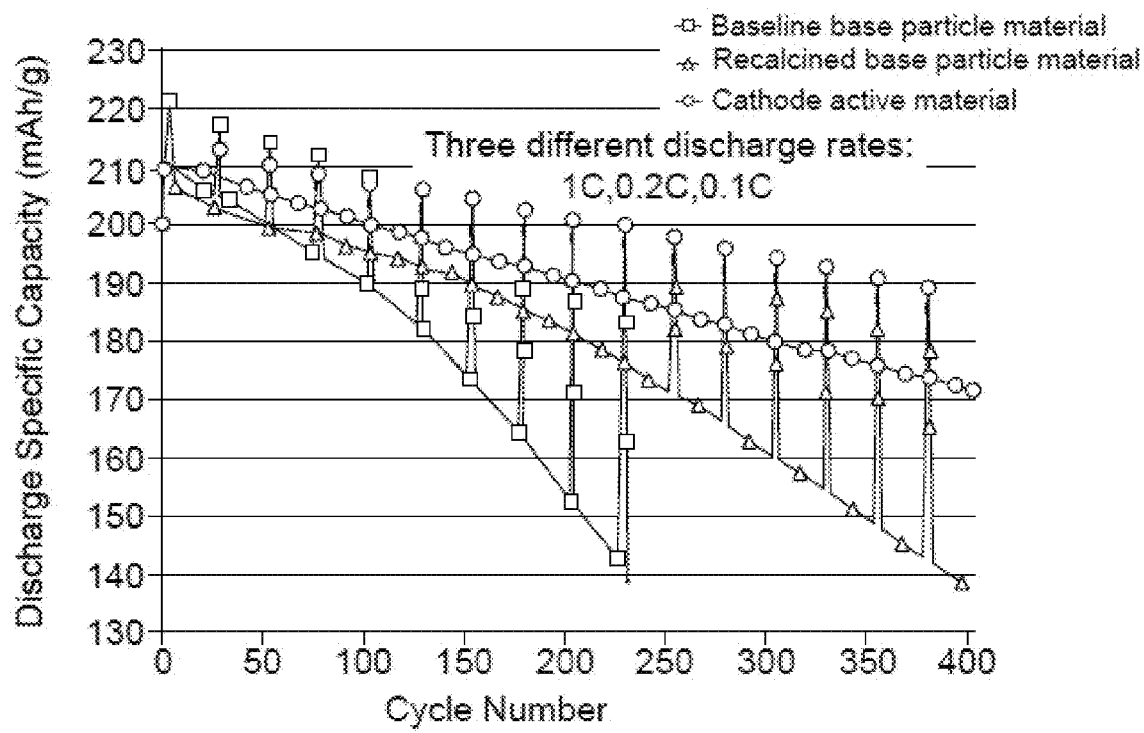
FIG. 23 is a graph showing the discharge specific capacity versus cycle number for the cathode active material and the base particle materials of Example 3.
Figure 24:
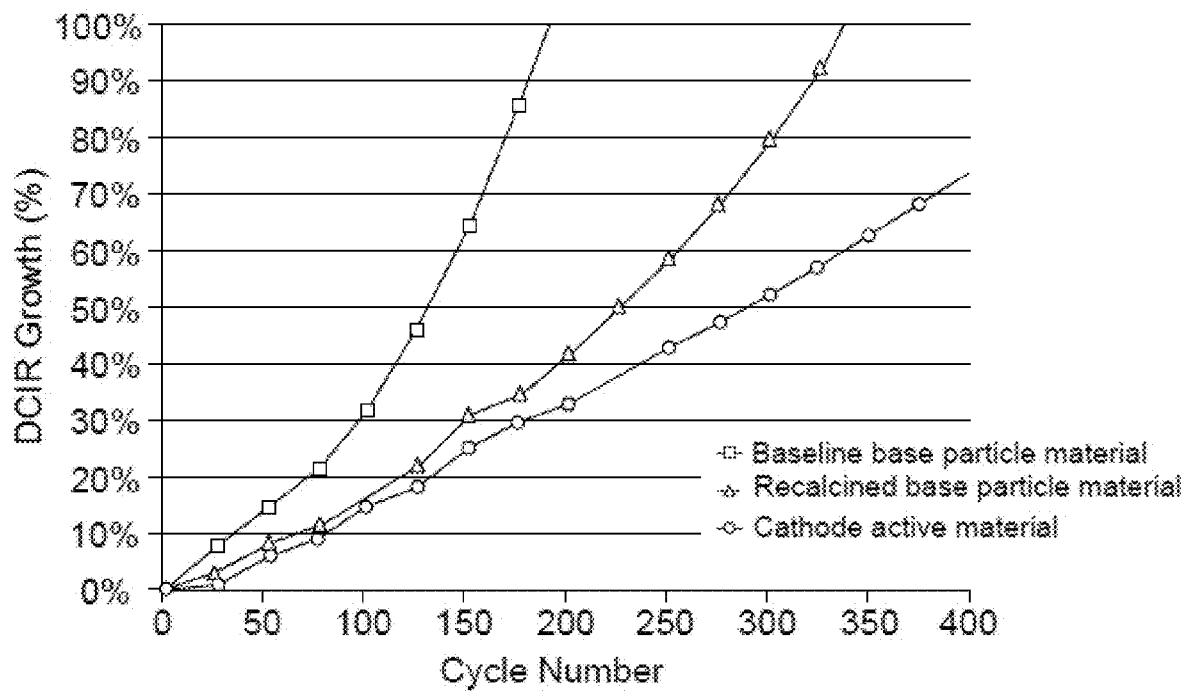
FIG. 24 is a graph showing the direct current resistance (DCR) growth versus cycle number for the cathode active material and base particle materials of Example 3.
Figure 25:
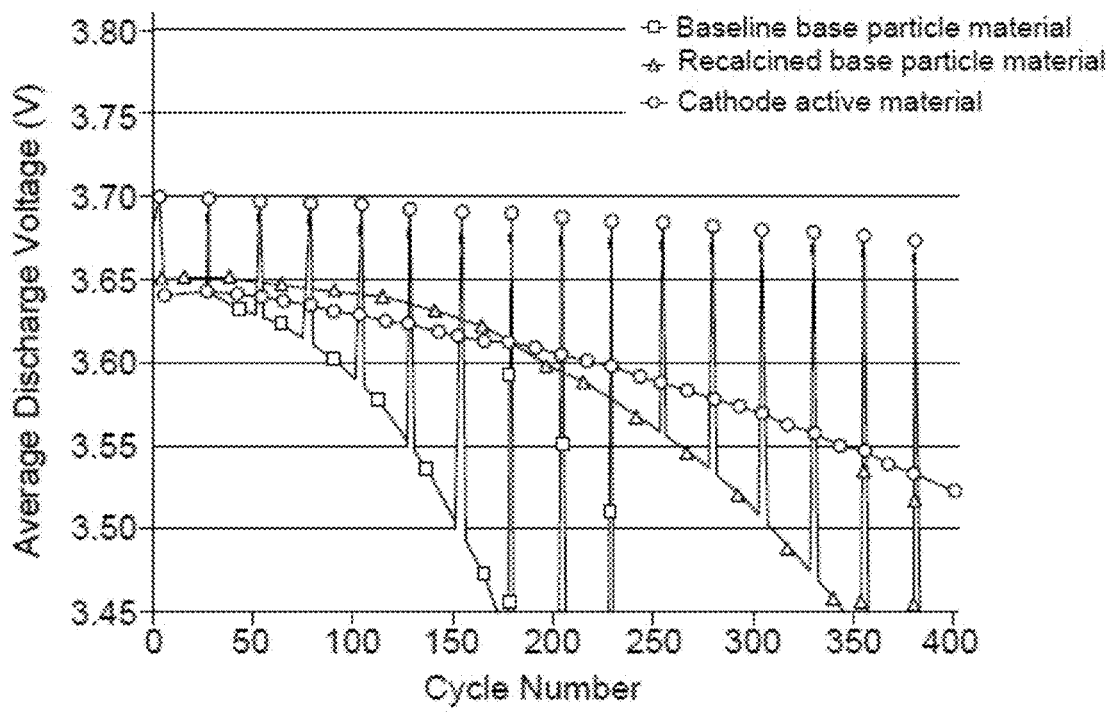
FIG. 25 is a graph showing the average discharge voltage versus cycle number for the cathode active material and base particle materials of Example 3.

There is significant improvement to the cycle life (defined as reaching 80% of the beginning of life energy) when the cathode active material is used compared to the base particle material alone and the recalcined base particle material alone, from 190 cycles (325 cycles for the recalcined) to 500 cycles. FIGS. 22-25 are graphs of additional testing results of the materials in Example 3. Each of FIGS. 22-25 include data for a baseline base particle that has not been recalcined, a recalcined base particle that has been calcined at 700° C., and the cathode active material that has been calcined at 700° C. FIG. 22 shows the slower decline in energy versus cycle number for the cathode active material when compared to either the baseline or recalcined base particle material. FIG. 23 shows the reduction in capacity degradation as a function of cycle number when the cathode active material is used. FIG. 24 shows the slow-down in the growth of direct current resistance (DCR) for the cathode active material versus either the base or the recalcined base particle material. FIG. 25 shows the improved retention of average discharge voltage as a function of cycle number for the cathode active material when compared to the base particle material alone, both baseline and recalcined.

Example 4

Another representative cathode active material was produced with a base particle having a composition of $Li_{1.02}Ni_{0.6}Co_{0.2}Mn_{0.2}O_2$ coated with a coating material of $Li_{1.01}Co_{0.96}Mn_{0.04}O_2$ having a D50 particle diameter of 0.17 μm. The coating material was 4 wt. % of the cathode active material. The elemental analysis of the cathode active material was $Li_{0.97}Ni_{0.58}Co_{0.23}Mn_{0.19}O_2$. The cathode active material was coated with 1000 ppm $Al_2O_3$.

As shown in Table 5, the first coulombic efficiency is greater for the cathode active material than for the base particle material alone, indicating an increase in the reversible capacity when cathode active material is used. The discharge capacity increased from 159 mAh/g to 168 mAh/g.

TABLE 5

| Description | Cathode Active Material | Base particle |
|---|---|---|
| Nickel, mol. % | 58.0 | 60.0 |
| Coating nickel mol. % = 0 | | |
| Coating, ppm | $Al_2O_3$, 1000 ppm | |
| Gravimetric Energy Density at 4.3 V, mWh/L | 644 | 609 |
| Charge Capacity, mAh/g (0.1 C., CVC until C/40) | 193 | 190 |
| Discharge Capacity, mAh/g (0.1 DC to 2.5 V) | 168 | 159 |
| 1st Coulombic Efficiency (0.1 C./0.1 DC) to 4.3 V, % | 87.0 | 83.7 |
| Average Discharge Voltage, 0.1 C./0.1 DC, 4.3 V to 2.5 V, (V) | 3.84 | 3.82 |

Figure 26:
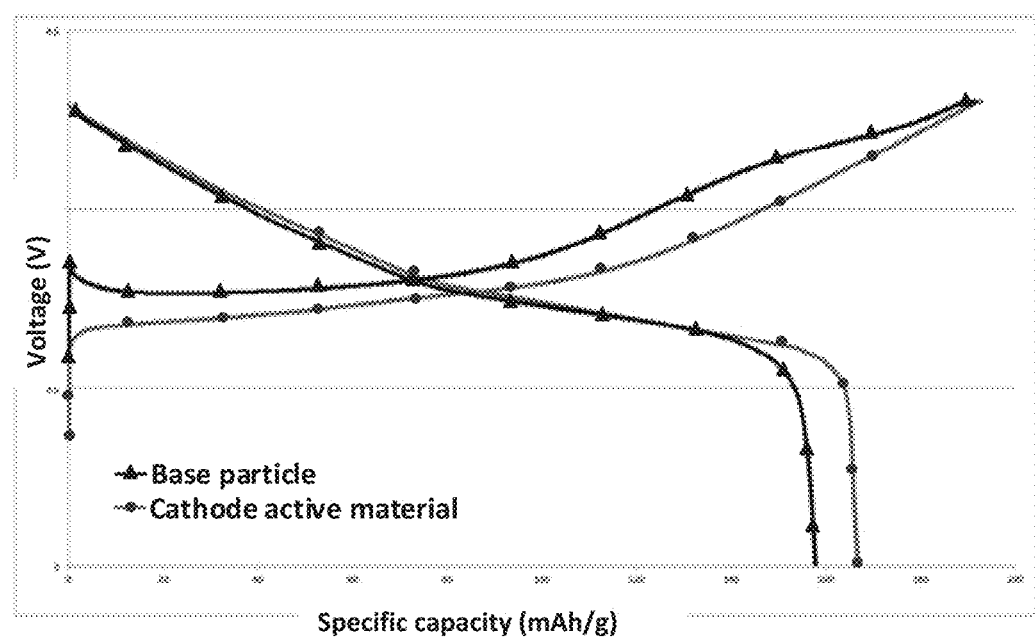
FIG. 26 is a charge/discharge profile of the cathode active material and the base particle material of Example 4.
Figure 27:
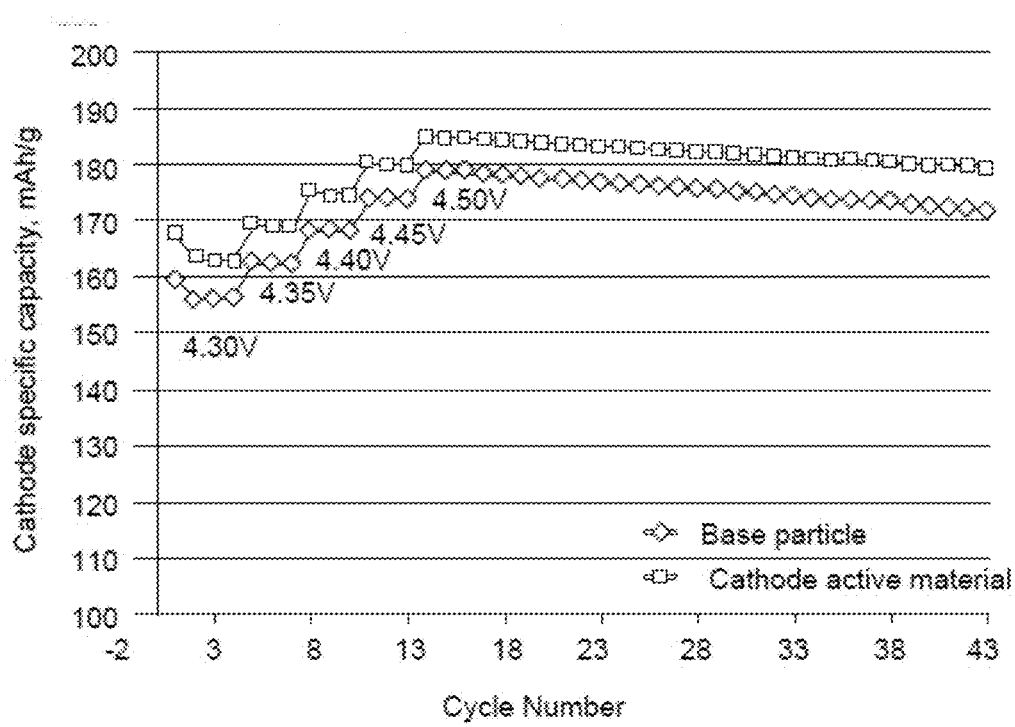
FIG. 27 is a graph of the cathode specific capacity versus cycle number for the cathode active material and base particle material of Example 4.

FIG. 26 is a charge/discharge profile for both the base particle alone calcined at 700° C. and the cathode active material calcined at 700° C. FIG. 27 shows specific capacity versus cycle number for both the base particle alone calcined at 700° C. and the cathode active material calcined at 700° C. The reduction in capacity degradation as a function of cycle number for the cathode active material, as well as the increase in the capacity irreversibility in the first cycle, are illustrated.

Example 5

Figure 28:
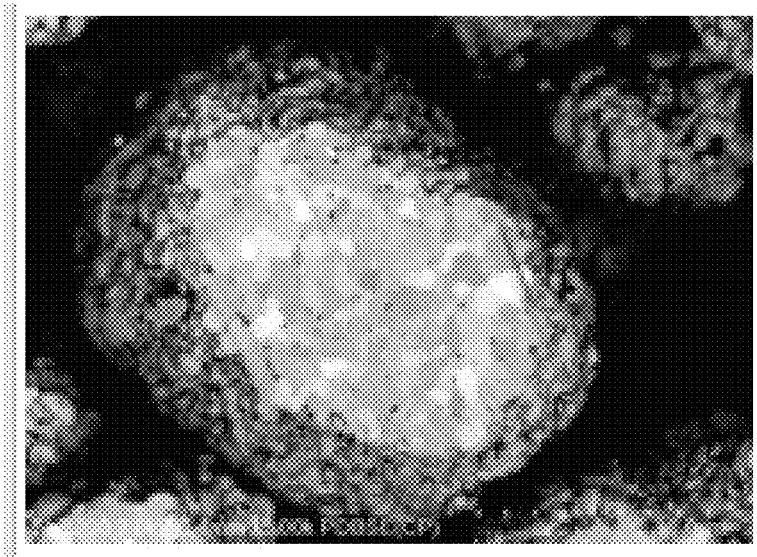
FIG. 28 is an SEM image of a cross section of a cathode active material particle of Example 5.

Another representative cathode active material was produced with a base particle having a composition of $Li_{1.02}Ni_{0.82}Co_{0.11}Mn_{0.02}O_2$ with a D50 particle diameter of 19 μm coated with a coating material of $Li_2MnO_3$. The coating material was 4 wt. % of the cathode active material. The elemental analysis of the cathode active material was $Li_{1.01}Ni_{0.81}Co_{0.11}Mn_{0.08}O_2$. The cathode active material was coated with 1000 ppm $Al_2O_3$. FIG. 28 is an SEM image of a cross section of a cathode active material particle of Example 5.

As shown in Table 6, the pellet density of the cathode active material is 3.60 g/cc, increased from the pellet density of 3.54 g/cc of the base particle alone. The first coulombic efficiency is greater for the cathode active material than for the base particle material alone, indicating an increase in the reversible capacity when the cathode active material is used. The discharge capacity increases from 204 mAh/g for the base particle to 209 mAh/g for the cathode active material and volumetric energy density increased form 2775 Wh/l to 2876 Wh/L.

TABLE 6

| Description | Cathode Active Material | Base particle |
|---|---|---|
| Nickel, mol. % | 81.0 | 82.0 |
| Coating nickel mol. % = 0 | | |
| Coating, ppm | $Al_2O_3$, 1000 ppm | |
| Volumetric Energy Density at 4.3 V, Wh/L | 2876 | 2775 |
| Gravimetric Energy Density at 4.3 V, mWh/g | 799 | 784 |
| Charge Capacity, mAh/g (0.1 C., CVC until C/40) | 227 | 226 |
| Discharge Capacity, mAh/g (0.1 DC to 2.5 V) | 209 | 204 |
| 1st Coulombic Efficiency (0.1 C./0.1 DC) to 4.3 V, % | 91.9 | 90.4 |
| Average Discharge Voltage, 0.1 C./0.1 DC, 4.3 V to 2.5 V, (V) | 3.83 | 3.84 |
| Pellet Density, g/cc (200 MPa unloaded) | 3.60 | 3.54 |
| PSD: d50, microns | 20 | 19 |
| BET Surface Area, $m^2$/g | 0.42 | 0.12 |

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art.

What is claimed is:

1. A cathode active material, comprising:
   a base particle formed of a single particle having the following formula:

$Li_\alpha Ni_x M_y Co_z O_2$, wherein $0.95 \le \alpha \le 1.5$, $0.6 \le x \le 1.0$, $0 \le y \le 0.4$, $0 \le z \le 0.4$ in mol percent; $x+y+z=1$; and M is one of Mn and Al; and
   coating particles forming a coating on the base particle, the coating particles having the following formula:

$Li_a Ni_b Mn_c Co_d O_2$, wherein $0.95 \le a \le 1.5$, $0 \le b \le 0.35$, $0 \le c \le 1.0$, $0 \le d \le 1.0$ in mol percent and $b+c+d=1$, wherein the base particle has a particle diameter ranging from 8 μm to 25 μm and each coating particle has a particle diameter ranging from 0.1 μm to 5 μm,
   wherein the base particle has one of the following compositions: $Li_{1.02}Ni_{0.8}Mn_{0.1}Co_{0.1}O_2$, $Li_{1.02}Ni_{0.82}Mn_{0.11}Co_{0.07}O_2$, $Li_{1.02}Ni_{0.94}Mn_{0.03}Co_{0.03}O_2$, $Li_a Ni_{0.8}Co_{0.15}Al_{0.05}O_2$ and $Li_{1.02}Ni_{0.89}Co_{0.1}Al_{0.01}O_2$ and the coating particles have one of the following compositions: $Li_a Ni_{1/3}Mn_{1/3}Co_{1/3}O_2$, $Li_a Mn_{0.07}Ni_{0.07}Co_{0.86}O_2$ and $Li_a Co_{0.96}Mn_{0.04}O_2$.

2. The cathode active material of claim 1, wherein an amount of the coating particles is >0.0 wt. % and ≤30 wt. % of the cathode active material.

3. The cathode active material of claim 1, wherein one or both the base particle and the coating particles are doped with one or more of B, Mg, Al, Ca, Ti, V, Si, F, Cr, Cu, Zn, Zr, Mo and Ru.

4. The cathode active material of claim 1, having an outer coating of a metal oxide, a metal fluoride or a metal phosphate.

5. The cathode active material of claim 1, having a pellet density of ≥3.4 g/cc.

6. A battery cell, comprising:
   an anode, comprising:
     an anode current collector; and
     an anode active material disposed over the anode current collector; and
   a cathode, comprising:
     a cathode current collector; and
     a cathode active material disposed over the cathode current collector, the cathode active material as claimed in claim 1.

7. The battery cell of claim 6, wherein the cathode active material has an outer coating of a metal oxide, a metal fluoride or a metal phosphate.

8. A method of preparing a cathode active material, comprising:
   lithiating a coating precursor to produce coating particles having the following formula:
     $Li_\alpha Ni_b Mn_c Co_d O_2$, wherein $0.95 \le \alpha \le 1.5$, $0 \le b \le 0.35$, $0 \le c \le 1.0$, $0 \le d \le 1.0$ in mol percent and $b+c+d=1$;
   lithiating a base precursor to produce base particles having the following formula:
     $Li_a Ni_x M_y Co_z O_2$, wherein $0.95 \le a \le 1.5$, $0.6 \le x \le 1.0$, $0 \le y \le 0.4$, $0 \le z \le 0.4$ in mol percent; $x+y+z=1$; and M is one of Mn and Al; and
   producing the cathode active material by one of:
     coating individual base particles with the coating particles;
     coating individual base precursor particles with the coating precursor prior to lithiating each of the individual base precursor particles and the coating precursor; and
     coating the individual base particles with the coating precursor prior to lithiating the coating precursor, wherein each individual base particle has a particle diameter ranging from 8 μm to 25 μm and the coating particles each have a particle diameter ranging from 0.1 μm to 5 μm;
   wherein the base particle has one of the following compositions: $Li_{1.02}Ni_{0.8}Mn_{0.1}Co_{0.1}O_2$, $Li_{1.02}Ni_{0.82}Mn_{0.11}Co_{0.07}O_2$, $Li_{1.02}Ni_{0.94}Mn_{0.03}Co_{0.03}O_2$, $Li_a Ni_{0.8}Co_{0.15}Al_{0.05}O_2$ and $Li_{1.02}Ni_{0.89}Co_{0.1}Al_{0.01}O_2$ and the coating particles have one of the following compositions: $Li_a Ni_{1/3}Mn_{1/3}Co_{1/3}O_2$, $Li_a Mn_{0.07}Ni_{0.07}Co_{0.86}O_2$ and $Li_a Co_{0.96}Mn_{0.04}O_2$.

9. The method of claim 8, wherein an amount of the coating particles is >0.0 wt. % and ≤30 wt. % of the cathode active material.

10. The method of claim 8, further comprising:
    doping one or both of the individual base particles and the coating particles with one or more of B, Mg, Al, Ca, Ti, V, Si, F, Cr, Cu, Zn, Zr, Mo and Ru.

11. The method of claim 10, further comprising:
    coating the active cathode material with a metal oxide, a metal fluoride or a metal phosphate.

12. The method of claim 8, wherein the cathode active material has a pellet density of ≥3.4 g/cc.

* * * * *